(12) United States Patent
Ohkawa

(10) Patent No.: US 11,174,938 B2
(45) Date of Patent: Nov. 16, 2021

(54) TRANSFER STRUCTURE FOR VEHICLE

(71) Applicant: MAZDA MOTOR CORPORATION, Hiroshima (JP)

(72) Inventor: Yuzo Ohkawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 147 days.

(21) Appl. No.: 16/681,900

(22) Filed: Nov. 13, 2019

(65) Prior Publication Data
US 2020/0158228 A1 May 21, 2020

(30) Foreign Application Priority Data

Nov. 19, 2018 (JP) .............................. JP2018-216347

(51) Int. Cl.
*F16H 57/04* (2010.01)
*B60K 17/344* (2006.01)
*F16H 1/06* (2006.01)

(52) U.S. Cl.
CPC ....... *F16H 57/0424* (2013.01); *B60K 17/344* (2013.01); *F16H 1/06* (2013.01); *F16H 57/0405* (2013.01); *F16H 57/0467* (2013.01)

(58) Field of Classification Search
CPC .............. F16H 57/0424; F16H 57/042; F16H 57/0421; F16H 57/0423; F16H 57/0405; B60K 17/344
See application file for complete search history.

(56) References Cited

U.S. PATENT DOCUMENTS

| 1,714,509 A * | 5/1929 | Kemble .............. F16H 57/0421 |
| | | 184/13.1 |
| 9,909,660 B2 * | 3/2018 | Toaso, Jr. ................ F16H 57/02 |
| 2017/0082188 A1 * | 3/2017 | McKimpson ....... F16H 57/0405 |

FOREIGN PATENT DOCUMENTS

JP 2017-065389 A 4/2017

* cited by examiner

*Primary Examiner* — Jake Cook
(74) *Attorney, Agent, or Firm* — Studebaker & Brackett PC

(57) ABSTRACT

A transfer structure for a vehicle which retains a stable amount of lubricant in a coupling chamber and maintains a cooling effect for a coupling by agitation of the lubricant irrespective of an inclination of a vehicle in a front-rear direction. The transfer structure includes a gear chamber housing first and second gears meshing with each other; a coupling chamber housing a coupling provided coaxially with the first gear; an introduction path which introduces a lubricant in the gear chamber into the coupling chamber; and a return path through which the lubricant in the coupling chamber is returned to the gear chamber. The return path is inclined downward toward the gear chamber from an opening that opens in a lower part of an intermediate part of the coupling chamber in a vehicle front-rear direction to an oil discharge hole that opens in the gear chamber.

16 Claims, 14 Drawing Sheets

TRANSFER STRUCTURE FOR VEHICLE

BACKGROUND

Technical Field

The present disclosure relates to a transfer structure mounted in a four-wheel-drive vehicle.

Background Art

A four-wheel-drive vehicle is known in which a driving source such as an engine and a transmission are disposed in a front part of a vehicle body with their axes extending in a vehicle front-rear direction. A transfer device is provided that transmits a driving force output from the transmission to rear wheels as main drive wheels via an output shaft for rear wheels extending toward a vehicle rear side and a differential for rear wheels, and takes a driving force to be output to front wheels as auxiliary drive wheels. The driving force taken by the transfer device is transmitted to the front wheels via an output shaft for front wheels extending toward a vehicle front side and a differential for front wheels, thereby allowing the rear wheels and also the front wheels to be driven.

A transfer device described in Japanese Patent Laid-Open No. 2017-65389 is such that a coupling that takes a driving force for front wheels is disposed on an output shaft for rear wheels. The coupling is completely fastened to cause a four-wheel-drive state where the driving force is equally transmitted to the front wheels and the rear wheels, and distribution of the driving force output to the front wheels is adjusted according to a fastening state between complete fastening and complete unfastening of the coupling.

The driving force taken by the coupling is transmitted to an output shaft for front wheels via a drive gear provided on the output shaft for rear wheels and a driven gear meshing with the drive gear and provided on the output shaft for front wheels, thereby allowing the rear wheels and also the front wheels to be driven.

The drive gear and the driven gear always mesh with each other, and thus the gears and bearings for supporting the gears need to be lubricated to prevent seizure of the meshing portion. For such lubrication, a lubricant is retained in a lower part of a gear chamber housing the drive gear and the driven gear. The lubricant is scooped from the driven gear to the drive gear, thereby performing scooping oil feeding.

On a vehicle rear side of the gear chamber, a coupling chamber housing the coupling is disposed. The coupling includes an electromagnetic pilot clutch, a cam mechanism, and a main clutch, and by adjusting a fastening state of the pilot clutch, the cam mechanism increases/decreases a pressing force on a friction plate of the main clutch to change a fastening state of the main clutch, thereby adjusting distribution of a driving force between the front wheels and the rear wheels. Thus, the friction plate of the main clutch generates heat by sliding. Also, particularly in a front engine and rear drive based four-wheel-drive vehicle, a final gear is provided in a differential for rear wheels, and thus an output shaft for rear wheels coupled to a transmission rotates at high speed, which increases an amount heat generated by the friction plate of the main clutch. Thus, a coupling chamber housing a coupling needs to be cooled.

As is conventional, a temperature of the coupling may exceed an allowable temperature by cooling with air via a case of the transfer device, and the coupling needs to be cooled to ensure durability of the coupling.

In this respect, the lubricant may be retained also in the coupling chamber as in the gear chamber for cooling. Also, an oil feed hole and an oil discharge hole may be provided in a side wall between the gear chamber and the coupling chamber to feed the lubricant scooped by the driven gear in the gear chamber to the coupling chamber and circulate the lubricant to cool the coupling by agitation of the lubricant.

However, when a vehicle travels in an inclined state on an upward slope or a downward slope, the lubricant retained in the coupling chamber is placed off to a vehicle front side or a vehicle rear side, or a large amount of lubricant flows out of the oil discharge hole, which may prevent a cooling effect from being obtained.

On the other hand, a lubricant level in the coupling chamber is preferably lowered to reduce agitation resistance. However, as described above, the lubricant is placed off to the front side or the rear side or discharged from the oil discharge hole in the inclined state of the vehicle, which further reduces the cooling effect.

SUMMARY

Then, the present disclosure provides a transfer structure for a vehicle which retains a stable amount of lubricant in a coupling chamber and maintains a cooling effect for a coupling by agitation of the lubricant irrespective of an inclination of a vehicle in a front-rear direction even in a situation where a lubricant level is lowered to reduce agitation resistance.

A transfer structure for a vehicle according to the present disclosure has configurations as described below.

First, a transfer structure for a vehicle according to a first aspect of the present application includes a gear chamber housing a first gear and a second gear meshing with each other; and a coupling chamber housing a coupling provided coaxially with the first gear. The transfer structure further includes an introduction path through which a lubricant in the gear chamber is introduced into the coupling chamber; and a return path through which the lubricant introduced into the coupling chamber is returned to the gear chamber. The return path is inclined downward toward the gear chamber from an opening that opens in a lower part of an intermediate part of the coupling chamber in a vehicle front-rear direction to an oil discharge hole that opens in the gear chamber.

In the transfer structure of a second aspect according to the first aspect, the return path has a through portion extending through an inner peripheral wall of the coupling chamber obliquely to an axis of the coupling chamber.

In the transfer structure of a third aspect according to the first or second aspect, the coupling chamber is closed by a cover member on a side opposite to the gear chamber. A groove parallel to the axis of the coupling chamber is formed from a mating surface between the coupling chamber and the cover member to the intermediate part of the coupling chamber in the vehicle front-rear direction in an inner peripheral surface of the coupling chamber. The opening is formed in an end surface of the groove in the intermediate part in the vehicle front-rear direction, and the groove and the through hole are formed by a cutting die.

In the transfer structure of a fourth aspect according to any one of the first to third aspects, the coupling chamber has a side wall that separates the coupling chamber from the gear chamber, and the oil discharge hole of the return path is formed in the side wall.

In the transfer structure of a fifth aspect according to the fourth aspect, an oil feed hole of the introduction path is formed in the side wall, and the oil feed hole is formed in a position corresponding to a rear side of a meshing portion between the first gear and the second gear in a rotational direction.

In the transfer structure of a sixth aspect according to any one of the first to fifth aspects, an oil temperature sensor that detects a temperature of the lubricant is provided in the return path.

According to the first aspect, the lubricant in the gear chamber is introduced through the introduction path into the coupling chamber and retained in the coupling chamber. The lubricant retained in the coupling chamber is agitated by rotation of the coupling to cool the coupling. Part of the lubricant in the coupling chamber is returned through the return path to the coupling chamber, and thus a substantially constant oil level can be maintained in the coupling chamber according to a position of the oil discharge hole of the return path.

The return path has the opening that opens in the lower part of the intermediate part of the coupling chamber in the vehicle front-rear direction, and is inclined downward toward the gear chamber to the oil discharge hole that opens in the gear chamber. Thus, if a vehicle is inclined downward toward a front side on a downward slope or the like, the position of the oil discharge hole is lowered. However, since the opening is located in a position higher than the oil discharge hole, the lubricant is not discharged from the oil discharge hole until the lubricant level becomes higher than the opening even if it becomes higher than the oil discharge hole. Thus, a stable amount of lubricant can be retained in the coupling chamber, and a cooling effect for the coupling by agitation of the lubricant can be maintained irrespective of the inclination of the vehicle in the front-rear direction even in a situation where the lubricant level is lowered to reduce agitation resistance.

According to the second aspect, the return path has the through portion extending through the inner peripheral wall of the coupling chamber obliquely to the axis of the coupling chamber. Thus, the return path can be formed in the inner peripheral wall of the coupling chamber. This can prevent an increase in size of an outer wall of a transfer chamber, thereby providing a compact transfer device.

According to the third aspect, the opening of the return path is formed in the end surface of the groove, thereby allowing the opening to be precisely positioned in the intermediate part of the coupling chamber in the vehicle front-rear direction. Also, the groove and the through hole can be formed by the cutting die, thereby allowing the through hole to be formed simultaneously with the groove being formed and facilitating manufacture.

According to the fourth aspect, the oil discharge hole of the return path is formed in the side wall that separates the coupling chamber from the gear chamber, thereby allowing the oil discharge hole to be formed simultaneously with the gear chamber being formed and simplifying manufacture.

According to the fifth aspect, the oil feed hole is formed in the position corresponding to the rear side of the meshing portion between the first gear and the second gear in the rotational direction. This allows the lubricant at relatively low temperature retained at a bottom of the gear chamber to be scooped by the second gear and fed from the oil feed hole to the coupling chamber, thereby ensuring a cooling effect for the coupling.

According to the sixth aspect, the oil temperature sensor that detects the temperature of the lubricant is provided in the return path. This allows the oil temperature sensor to reliably detect the temperature of the lubricant always flowing through the return path even without the oil temperature sensor being immersed in the lubricant.

DETAILED DESCRIPTION

Now, a transfer structure for a vehicle according to the present disclosure will be described.

General Structure of Transfer Device

Figure 1:
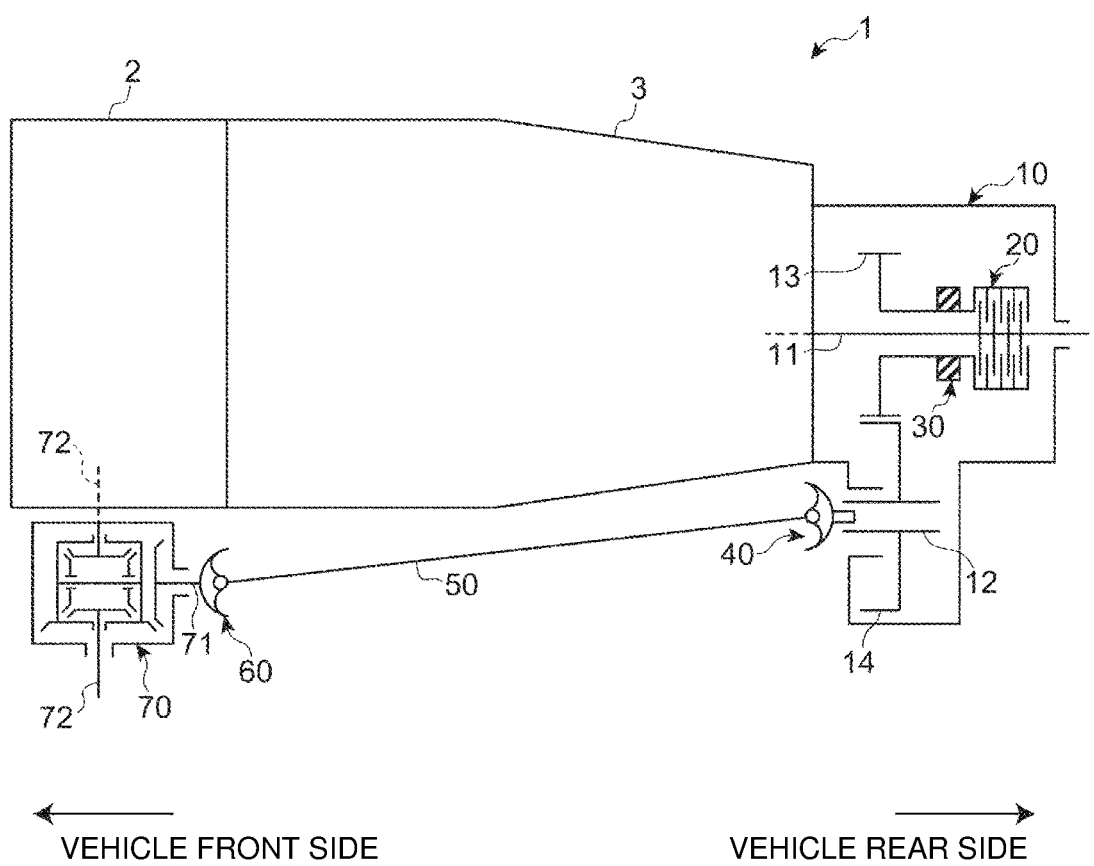
FIG. 1 is a schematic view of a transfer structure for a vehicle according to an embodiment of the present disclosure.

As shown in FIG. 1, a four-wheel-drive vehicle 1 in which a transfer device according to an embodiment of the present disclosure is mounted is a front engine and rear drive based four-wheel-drive vehicle 1, and an engine 2 as a driving source and a transmission 3 are disposed in a front part of a vehicle body with their axes extending in a vehicle front-rear direction.

A transfer device 10 is provided on a vehicle rear side of the transmission 3. The transfer device 10 includes an output shaft for rear wheels 11 that outputs a driving force output from the transmission 3 toward the vehicle rear side, and an output shaft for front wheels 12 that is disposed parallel to the output shaft for rear wheels 11 and outputs the driving force to front wheels.

On the output shaft for rear wheels 11, a coupling 20, a drive gear 13 as a first gear that is disposed on a vehicle front side of the coupling 20 and transmits a driving force taken from the coupling 20 to the output shaft for front wheels 12, and a damper 30 disposed between the coupling 20 and the drive gear 13 are provided.

On the output shaft for front wheels 12, a driven gear 14 as a second gear that meshes with the drive gear 13 is provided. The driving force for front wheels taken by the coupling 20 is transmitted via the drive gear 13 and the driven gear 14 to the output shaft for front wheels 12.

The output shaft for front wheels 12 is coupled via a universal joint 40 to a propeller shaft for front wheels 50 extending toward the vehicle front side. The propeller shaft for front wheels 50 is coupled via a universal joint 60 to an input shaft 71 of a differential for front wheels 70, and the input shaft 71 is coupled to axles 72, 72 coupled to left and right front wheels.

Thus, the driving force taken by the coupling 20 is transmitted via the drive gear 13 and the driven gear 14 to the output shaft for front wheels 12, and transmitted from the output shaft for front wheels 12 via the propeller shaft for front wheels 50 and the differential for front wheels 70 to the front wheels. In the four-wheel-drive vehicle 1, the coupling 20 can change torque distribution between the front wheels and the rear wheels within a range of 0:100 to 50:50. An operation of the coupling 20 is controlled by a control unit (not shown).

The damper 30 reduces, to a practical range or lower of the engine 2, a resonance frequency at which a drive system on the side of the front wheels resonates with torque variation of the engine 2. The drive system is a system from the coupling 20 via the drive gear 13, the driven gear 14, the output shaft for front wheels 12, the propeller shaft for front wheels 50, and the differential for front wheels 70 to the front wheels.

Detailed Structure of Transfer Device

Figure 2:
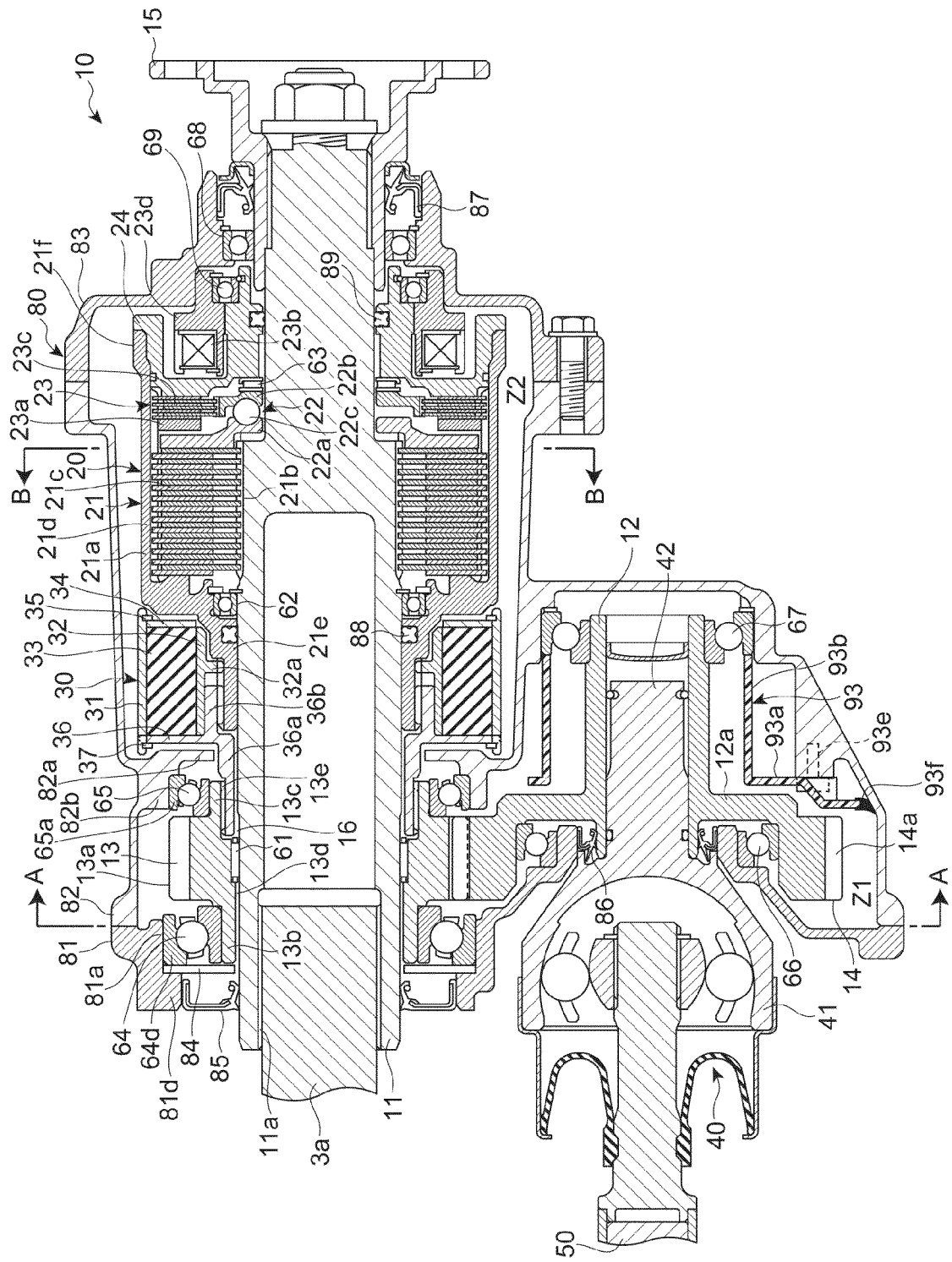
FIG. 2 is an enlarged sectional view of a transfer device according to this embodiment.

Next, with reference to FIG. 2, the transfer device 10 according to the embodiment of the present disclosure will be further described in detail.

The output shaft for rear wheels 11 is disposed coaxially with the input shaft 3a from the transmission 3, and rotates together with the input shaft 3a. A front end of the output shaft for rear wheels 11 has a recess 11a opening on the vehicle front side, and a rear end of the input shaft 3a from the transmission 3 is splined to an inner peripheral surface of the recess 11a.

A coupling member 15 for coupling the output shaft for rear wheels 11 via a universal joint (not shown) to a propeller shaft for rear wheels is splined to a rear end of the output shaft for rear wheels 11.

On the output shaft for rear wheels 11, the drive gear 13, the damper 30, and the coupling 20 are disposed in this order from the vehicle front side.

The drive gear 13 includes a tooth portion 13a with an inclined tooth on an outer peripheral surface, and a front cylindrical portion 13b and a rear cylindrical portion 13c extending integrally from an inner peripheral side of the tooth portion 13a toward the vehicle front side and the vehicle rear side.

On an inner peripheral side of the drive gear 13, a through hole 13d is provided through which the output shaft for rear wheels 11 extends. A needle bearing 61 is provided at a mating portion 16 between the drive gear 13 and the output shaft for rear wheels 11. The drive gear 13 is rotatable relative to the output shaft for rear wheels 11.

In an inner periphery of the rear cylindrical portion 13c of the drive gear 13, a spline portion 13e coupled to the damper 30 is formed.

The damper 30 includes an outer cylindrical member 31 forming an outer periphery of the damper 30, an inner cylindrical member 32 forming an inner periphery of the damper 30, and an elastic member 33 provided and joined between the outer cylindrical member 31 and the inner cylindrical member 32.

On a side surface of the damper 30 on the side of the coupling 20, a protrusion preventing member 34 is provided to prevent protrusion of the elastic member 33 housed between the outer cylindrical member 31 and the inner cylindrical member 32 of the damper 30. At the protrusion preventing member 34 and the end of the outer cylindrical member 31 of the damper 30 on the side of the coupling 20, a snap ring 35 prevents slip of the protrusion preventing member 34 from the outer cylindrical member 31.

A power transmission member 36 is fitted with a comb tooth to or splined to an end of the outer cylindrical member 31 of the damper 30 on the side of the drive gear 13, and a snap ring 37 prevents slip of the power transmission member 36 from the outer cylindrical member 31.

On an inner peripheral side of the power transmission member 36, a cylindrical portion 36a is provided extending axially to near the needle bearing 61 on an inner peripheral side of the drive gear 13. The cylindrical portion 36a is splined to the spline portion 13e in the rear cylindrical portion 13c of the drive gear 13.

On the inner peripheral side of the power transmission member 36, a cylindrical coupling portion 36b is provided extending to the coupling 20 on an inner peripheral side of the inner cylindrical member 32 of the damper 30 and coupled to the coupling 20. On the inner peripheral side of the inner cylindrical member 32 of the damper 30, a spline portion 32a is provided alongside the coupling portion 36b of the power transmission member 36 and coupled to the coupling 20.

The coupling 20 includes a multiplate wet main clutch 21, a cam mechanism 22, and an electromagnetic pilot clutch 23.

The main clutch 21 includes an outer rotary member 21a coupled to the damper 30, an inner rotary member 21b constituted by the output shaft for rear wheels 11, and a plurality of friction plates 21c alternately engaging the rotary members.

The outer rotary member 21a includes a cylindrical body 21d having an inner periphery that the plurality of friction plates 21c engage, and a connecting portion 21e extending from a front end of the body 21d toward the vehicle front side and having a smaller diameter than the body 21d. The connecting portion 21e is coupled to the coupling portion 36b of the power transmission member 36 of the damper 30 and the spline portion 32a of the inner cylindrical member 32.

Thus, the outer rotary member 21a is connected via the damper 30, the drive gear 13, the driven gear 14, the universal joint 40, the propeller shaft for front wheels 50, the universal joint 60, and the differential for front wheels 70 to the axles 72, 72 coupled to the left and right front wheels.

A bearing 62 is fitted between an inner peripheral side of an end of the connecting portion 21e of the outer rotary member 21a on the side of the body 21d and the output shaft for rear wheels 11. The outer rotary member 21a is supported rotatably relative to the output shaft for rear wheels 11.

A rear end 21f of the body 21d of the outer rotary member 21a opens on the vehicle rear side. The rear end 21f of the body 21d is covered with the cover member 24.

The cam mechanism 22 is disposed on the output shaft for rear wheels 11 between the plurality of friction plates 21c of the main clutch 21 and the cover member 24. The cam mechanism 22 includes a pair of disk-shaped main cams 22a disposed to face each other, a pilot cam 22b, and a ball member 22c.

The main cam 22a is axially movably splined to the inner rotary member 21b, and extends to near the plurality of friction plates 21c of the main clutch 21 on a circumferentially outer side. The pilot cam 22b is rotatably provided on the output shaft for rear wheels 11. A bearing 63 is fitted between the pilot cam 22b and the cover member 24 so that the pilot cam 22b and the cover member 24 are rotatable relative to each other.

The pilot clutch 23 includes an armature 23a disposed on a rear side of the main cam 22a, a solenoid 23b disposed on a rear side of the cover member 24, and a plurality of friction plates 23c provided between the armature 23a and the cover member 24.

The plurality of friction plates 23c alternately engage the inner peripheral side of the outer rotary member 21a of the main clutch 21 and an outer peripheral side of the pilot cam 22b.

The pilot clutch 23 is configured so that a magnetic force of the solenoid 23b attracts the armature 23a to fasten the plurality of friction plates 23c.

The pilot clutch 23 is operated to relatively rotate the main cam 22a and the pilot cam 22b of the cam mechanism 22. Thus, the ball member 22c presses and moves the main cam 22a toward the main clutch 21.

The plurality of friction plates 21c of the main clutch 21 are fastened by the main cam 22a moving toward the main clutch 21.

The pilot clutch 23 can increase/decrease magnetic intensity by controlling an amount of current supplied to the solenoid 23b. An attractive force for the armature 23a is proportional to the magnetic intensity. A fastening force for the plurality of friction plates 23c of the pilot clutch 23 changes according to the attractive force for the armature 23a.

An amount of circumferential rotation of the pilot cam 22b (amount of rotation relative to the main cam of the pilot cam) changes according to the fastening force for the plurality of friction plates 23c of the pilot clutch 23. A pressing force of the ball member 22c on the main cam 22a changes according to the amount of relative rotation of the cams 22a, 22b, thereby adjusting a fastening force for the plurality of friction plates 21c of the main clutch 21. Thus, driving force distribution can be adjusted between a front wheel side and a rear wheel side of the coupling 20 according to the amount of current in the solenoid 23b.

On the other hand, the output shaft for front wheels 12 disposed parallel to the output shaft for rear wheels 11 is formed integrally with the driven gear 14.

The output shaft for front wheels 12 has an extending portion 12a extending radially outward on the vehicle front side. The driven gear 14 extends from an upper end of the extending portion 12a toward the vehicle front side and is disposed to mesh with the drive gear 13. The driven gear 14 has a tooth portion 14a with an inclined tooth on an outer peripheral surface.

The output shaft for front wheels 12 is hollow, and a shaft-shaped portion 42 provided in an outer joint member 41 of the universal joint 40 to which the propeller shaft for front wheels 50 is coupled is inserted through the inner periphery of the output shaft for front wheels 12.

The above configurations of the transfer device 10 in this embodiment are housed in a transfer case 80.

The transfer case 80 is divided into a first case member 81, a second case member 82, and a third case member 83 disposed in order from the vehicle front side. The first case member 81 and the second case member 82 are fastened by a fastening bolt (not shown) or the like, and the second case member 82 and the third case member 83 are fastened by a fastening bolt (not shown) or the like.

In the transfer case 80, a gear chamber Z1 housing the drive gear 13 and the driven gear 14, and a coupling chamber Z2 housing the coupling 20 and the damper 30 are provided.

A lower part of the gear chamber Z1 functions as a lubricant retaining portion that retains a lubricant. At an end of the coupling chamber Z2 on the vehicle front side, a side wall 82a is provided that separates the coupling chamber Z2 from the gear chamber Z1.

The drive gear 13 is rotatably supported in the transfer case 80 via a front bearing 64 and a rear bearing 65 provided on the outer peripheral side of the front cylindrical portion 13b and the rear cylindrical portion 13c.

An outer race 64a of the front bearing 64 is press-fitted in a recessed support 81a provided in the first case member 81. On the other hand, an outer race 65a of the rear bearing 65 is pressed-fitted in a support 82b formed by a boss rising from the side wall 82a of the second case member 82 toward the gear chamber Z1.

At an end of the front bearing 64 on the vehicle front side, a plate member 84 is provided that is in contact with the outer race 64a of the front bearing 64, and extends from an inner peripheral surface of the support 81a of the first case member 81 toward the outer peripheral surface of the output shaft for rear wheels 11.

The driven gear 14 is rotatably supported in the transfer case 80 via bearings 66, 67 provided on the inner peripheral side of the tooth portion 14a and the outer periphery of the output shaft for front wheels 12 on the vehicle rear side.

A coupling member 15 at a rear end of the output shaft for rear wheels 11 is rotatably supported via a bearing 68 in the third case member 83.

The solenoid 23b of the pilot clutch 23 is secured to the third case member 83 via a cylindrical support member 23d that supports the solenoid 23b. A rear side of the coupling 20 is rotatably supported via a bearing 69 in the third case member 83.

In the transfer device 10, a plurality of seal members 85, 86, 87 are also disposed in the transfer case 80 to prevent the lubricant in the transfer case 80 from leaking outside.

Specifically, the seal member 85 is disposed between the first case member 81 and the output shaft for rear wheels 11 and the seal member 86 is disposed between the first case member 81 and the output shaft for front wheels 12 at an end of the first case member 81 on the vehicle front side, and the seal member 87 is disposed between the third case member 83 and the coupling member 15.

A front seal member 88 is disposed between a rear end of the connecting portion 21e of the main clutch 21 of the coupling 20 and the outer peripheral side of the output shaft for rear wheels 11. A rear seal member 89 is disposed between the inner peripheral side of the cover member 24 of the coupling and the outer peripheral side of the output shaft for rear wheels 11.

The front seal member 88 and the rear seal member 89 seal the inside of the coupling 20 and the coupling chamber Z2. Thus, the lubricant in the coupling 20 is separated from a different lubricant fed from the gear chamber Z1 to the coupling chamber Z2.

Lubricant Guide Structure

In the gear chamber Z1 of the transfer device 10, the lubricant retained in the gear chamber Z1 is scooped and dispersed by a tooth surface 14b of the driven gear 14 and fed to the drive gear 13 for lubrication.

In addition to lubrication of the gear chamber Z1, the transfer device 10 in this embodiment includes, as a lubricant guide structure for lubricating and cooling the coupling chamber Z2, an introduction path through which the lubricant retained in the gear chamber Z1 is introduced into the coupling chamber Z2, a return path through which the lubricant introduced into the coupling chamber Z2 is returned to the gear chamber Z1, and a coupling chamber lubrication path through which the lubricant in the coupling chamber Z2 is guided to the vehicle rear side.

Introduction Path

First, with reference to FIGS. 3 and 4, the introduction path will be described through which the lubricant retained in the gear chamber Z1 is introduced to the coupling chamber Z2 and which constitutes part of the lubricant guide structure.

Figure 3:
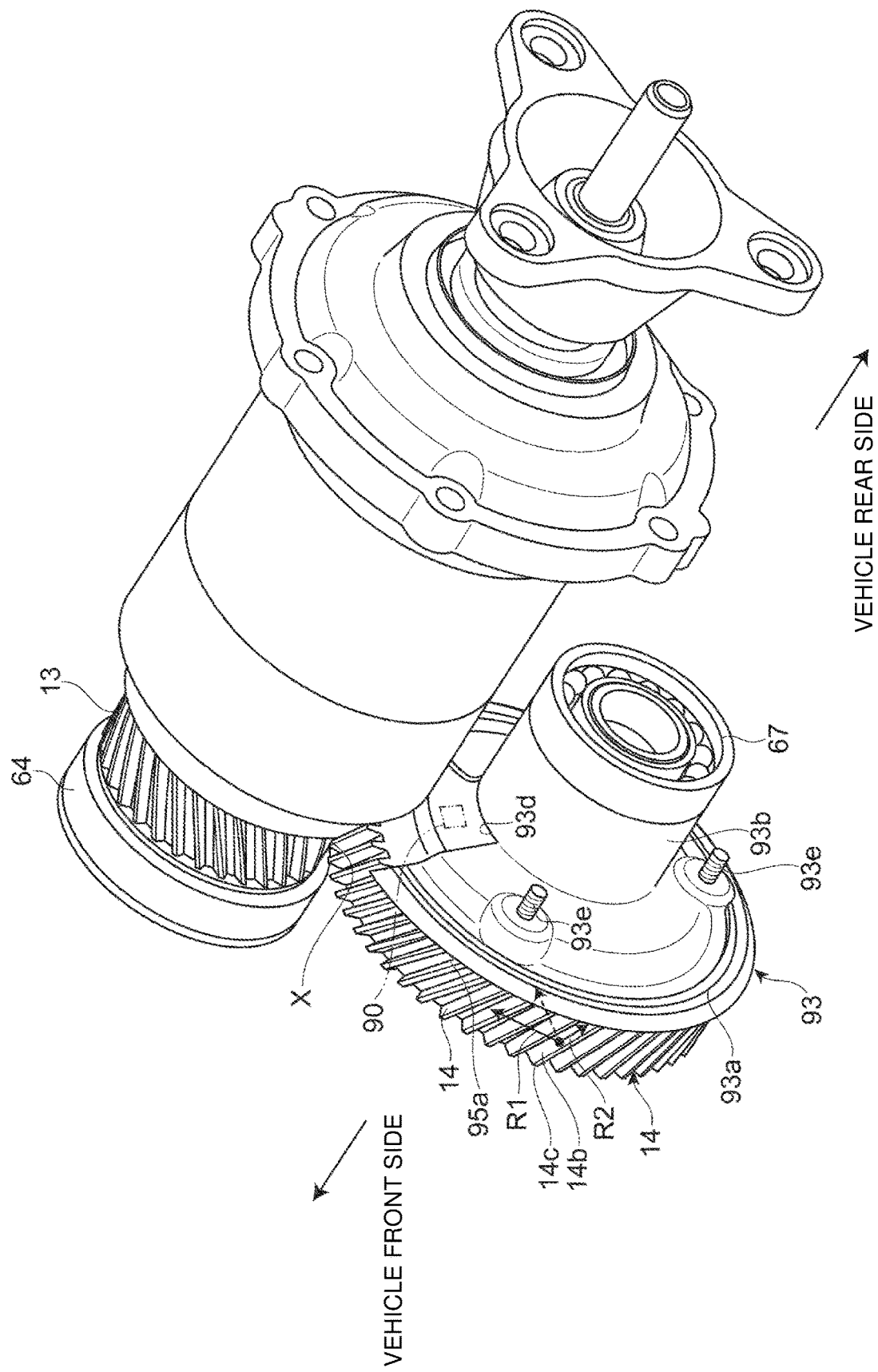
FIG. 3 is a perspective view of the transfer device according to this embodiment with a case being removed.

As shown in FIG. 3, the tooth surface 14b of the driven gear 14 is inclined to a rotational direction of the driven gear 14. Thus, one side of the tooth surface 14b is located on a rear side of the driven gear 14 in the rotational direction, and the other side of the tooth surface 14b is located on a front side of the driven gear 14 in the rotational direction. In this embodiment, as shown in FIG. 3, a side 14c on the front side of the tooth surface 14b in the rotational direction R1 of the driven gear 14 as a helical gear is located on the vehicle front side.

The lubricant on the tooth surface 14b of the driven gear 14 is about to flow in the direction of arrow R2 along an inclination of the tooth surface 14b of the driven gear 14 in a static state. However, since the driven gear 14 is rotating in the direction of arrow R1, the lubricant is likely to be dispersed toward the vehicle rear side and unlikely to be dispersed toward the vehicle front side.

Figure 4A:
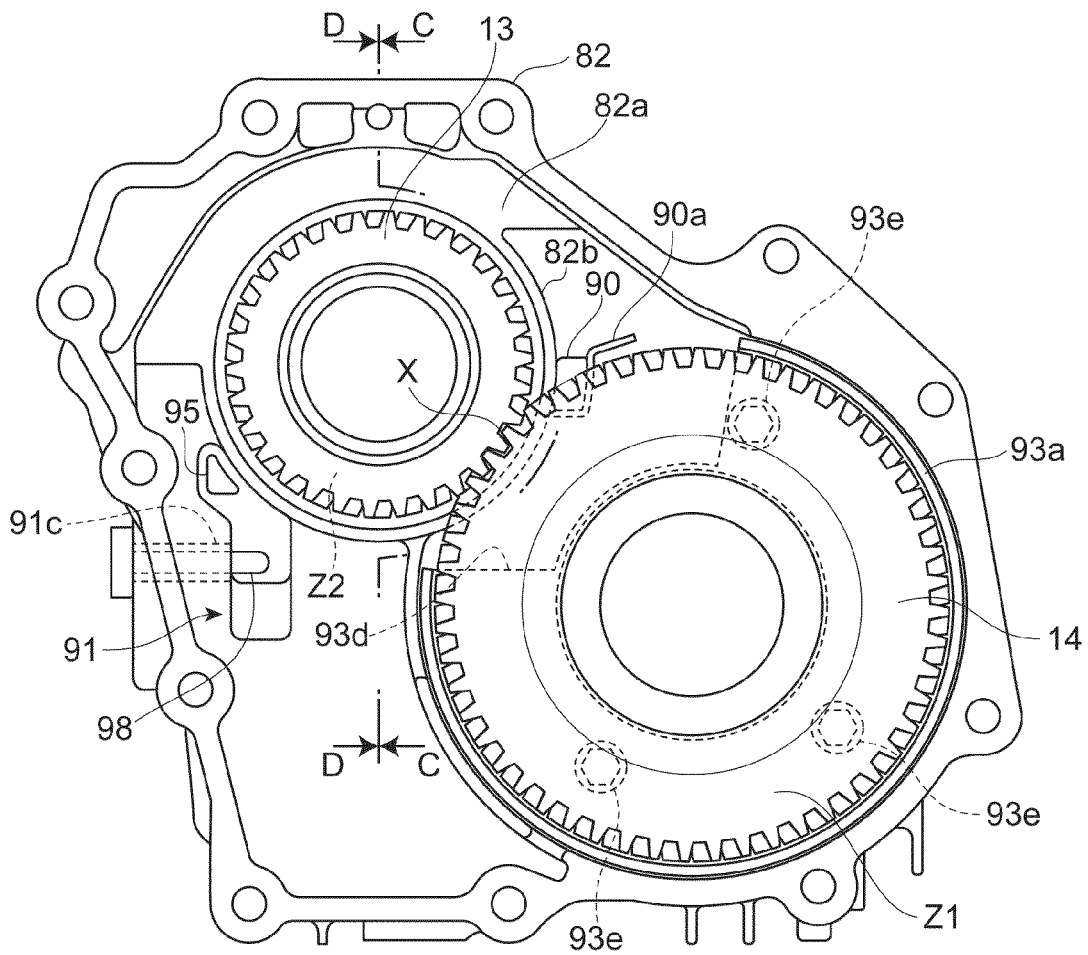
FIG. 4A is a front view of the transfer device taken in the direction of arrow A-A in FIG. 2 with a first case member of a transfer case being removed.

As shown in FIG. 4A, an oil feed hole 90 is provided in a position corresponding to a rear side of a meshing portion X between the drive gear 13 and the driven gear 14 in the rotational direction, in the side wall 82a of the coupling chamber Z2. The oil feed hole 90 provides communication between the gear chamber Z1 and the coupling chamber Z2. The oil feed hole 90 is provided along an outer peripheral surface 82c of the support 82b that supports the front bearing 64 for the drive gear 13 on the side of the coupling 20, in the side wall 82a of the coupling chamber Z2.

Figure 4B:
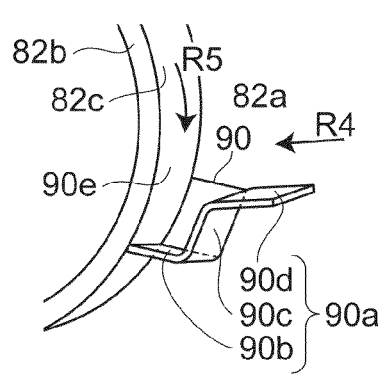
FIG. 4B is an enlarged perspective view of essential portions of an oil feed hole and therearound.

As shown in FIG. 4B, the oil feed hole 90 includes a guide portion 90a that is formed by a projection protruding from the side wall 82a toward the gear chamber Z2 and guides the lubricant to the oil feed hole 90.

The guide portion 90a includes a bottom surface 90b extending along a lower end of the oil feed hole 90 from the outer peripheral surface 82c of the support 82b to the side opposite to the support 82b, a side surface 90c rising along the oil feed hole 90 from a end of the bottom surface 90b on the side opposite to the support 82b, and an inclined surface 90d extending along the tooth surface of the driven gear 14 from an upper end of the side surface 90c further to the side opposite to the support 82b. The bottom surface 90b is inclined downward toward the oil feed hole 90, and thus can reliably guide the lubricant to the oil feed hole 90.

Since the oil feed hole 90 is provided along the support 82b, part of the outer peripheral surface 82c of the support 82b also functions as a guide portion 90e that guides the lubricant to the oil feed hole 90.

The gear chamber Z1 includes an oil path 93 through which the lubricant scooped by the driven gear 14 is transported to the position corresponding to the meshing portion X between the drive gear 13 and the driven gear 14 and guided to the oil feed hole 90.

As shown in FIGS. 3 and 4, the oil path 93 includes a doughnut disk-shaped base surface 93a, and a cylindrical portion 93b extending from an inner peripheral side of the base surface 93a toward the vehicle rear side. A fan-shaped notch 93d is provided in an upper part of the base surface 93a.

The base surface 93a of the oil path 93 is secured to a mounting portion provided on the inner periphery of the second case member 82 by a plurality of bolts 93e . . . 93e.

The base surface 93a and the cylindrical portion 93b of the oil path 93 are disposed to cover a surface of the extending portion 12a of the output shaft for front wheels 12 on the vehicle rear side and the vehicle rear side of the extending portion 12a of the output shaft for front wheels 12 (see FIG. 2).

A seal member 93f is disposed on an outer periphery of the base surface 93a of the oil path 93, and seals the oil path 93 and the inner peripheral surface of the second case member 82 (see FIG. 2).

The notch 93d in the oil path 93 is disposed in the position corresponding to the meshing portion X between the drive gear 13 and the driven gear 14.

Return Path

Next, the return path will be described through which the lubricant introduced into the coupling chamber Z2 is returned to the gear chamber Z1.

Figure 5:
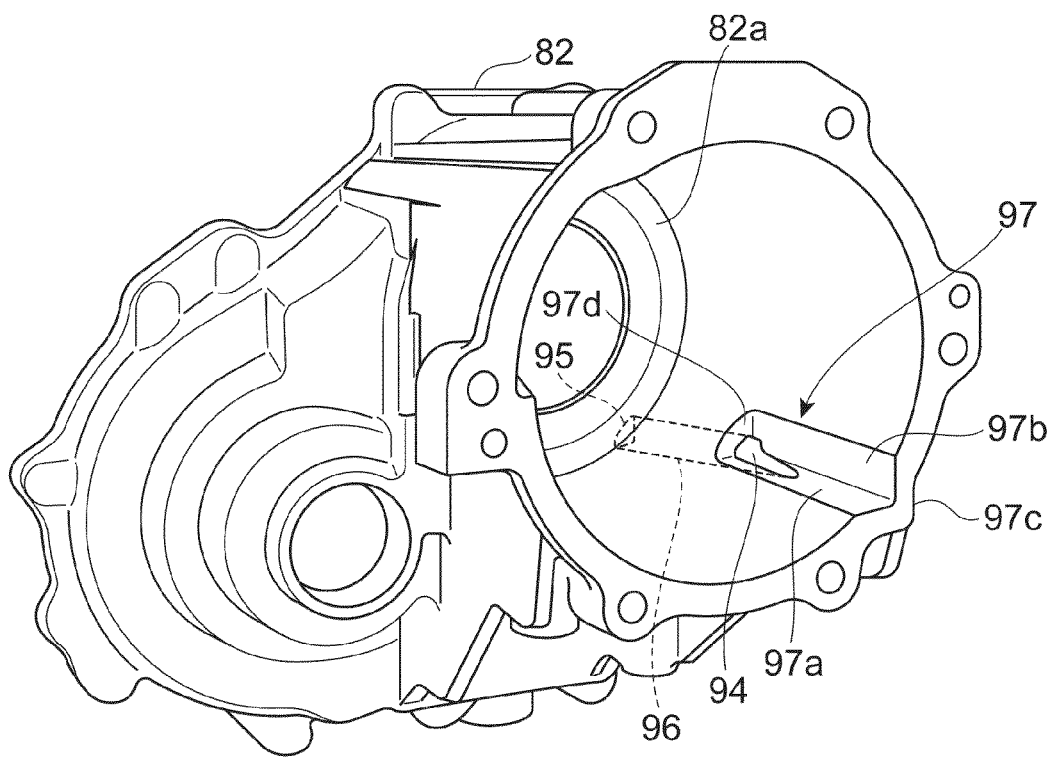
FIG. 5 is a perspective view of a return path provided in a second case member.

As shown in FIG. 5, the return path includes an opening 94 that opens in the coupling chamber Z2, an oil discharge hole 95 that opens in the gear chamber Z1, and a through portion 96 extending downward through the inner peripheral wall of the coupling chamber Z2 from the opening 94 in the coupling chamber Z2 to the oil discharge hole 95 in the gear chamber Z1 obliquely to an axis of the coupling chamber Z2.

A groove 97 having a triangular section is formed from an end surface of the second case member 82 on the side opposite to the gear chamber, that is, a mating surface with the third case member 83 toward the gear chamber to an intermediate part of the coupling chamber Z2 in the vehicle front-rear direction. The intermediate part of the coupling chamber Z2 in the vehicle front-rear direction is an intermediate part between a wall surface of the side wall 82b of the second case member 82 on the side of the coupling chamber and an inner end surface of the third case member 83.

The groove 97 has a triangular section having a horizontal side surface 97a and a vertical side surface 97b. The horizontal side surface 97a of the groove 97 is located at the same height as a minimum level of the lubricant retained in the coupling chamber Z2. The horizontal side surface 97a does not need to be always a horizontal surface, but is an inclined surface inclined downward radially inward in the coupling chamber Z2 so that the lubricant does not gather on the horizontal side surface 97a. The vertical side surface 97b is a vertical surface so that a second die 103b of a cutting die 103 described later can be released obliquely upward. To form the groove 97, a thick portion of an outer surface of the second case member 82 is used or a bulge 97c is formed on the outer surface of the second case member 82. The opening 94 of the return path is formed across an end surface 97d of the groove 97 on the side of the gear chamber and the horizontal side surface 97a.

As shown in FIG. 4A, the side wall 82a of the coupling chamber Z2 has a discharge port 91 of the return path below the oil feed hole 90 and on the side opposite to the oil feed hole 90 with respect to the axis of the coupling chamber Z2. The discharge port 91 is located away from the meshing portion X between the drive gear 13 and the driven gear 14.

Figure 4C:
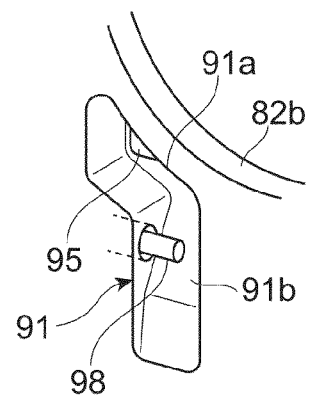
FIG. 4C is a perspective view of a discharge port.

As shown in FIG. 4C, the discharge port 91 includes an arcuate first discharge recess 91a along the outer peripheral surface 82c of the support 82b, and a second discharge recess 91b extending downward from a downstream end of the first discharge recess 91a. An oil discharge hole 95 having a substantially right triangular shape that opens from the coupling chamber Z2 to the gear chamber Z1 is formed in an upstream end of the first discharge recess 91a. The oil discharge hole 95 is located in a position lower than the opening 94 of the coupling chamber Z2.

The discharge port 91 has a sensor mounting hole 91c communicating with an outer surface of the gear chamber Z1, and an oil temperature sensor 98 is mounted to the sensor mounting hole 91c. The oil temperature sensor 98 mounted to the sensor mounting hole 91c is in contact with the lubricant always flowing through the discharge port 91, and thus can precisely detect a temperature of the lubricant even without being immersed in the lubricant retained in the coupling chamber Z2. The temperature sensor 98 detects the temperature of the lubricant, and if the temperature of the lubricant abnormally increases, measures may be taken such as switching from four-wheel drive to two-wheel drive.

Coupling Chamber Lubrication Path

Next, the coupling chamber lubrication path will be described through which the lubricant in the coupling chamber Z2 is guided to the bearings 68, 69 in the third case member 83 on the vehicle rear side.

Figure 6:
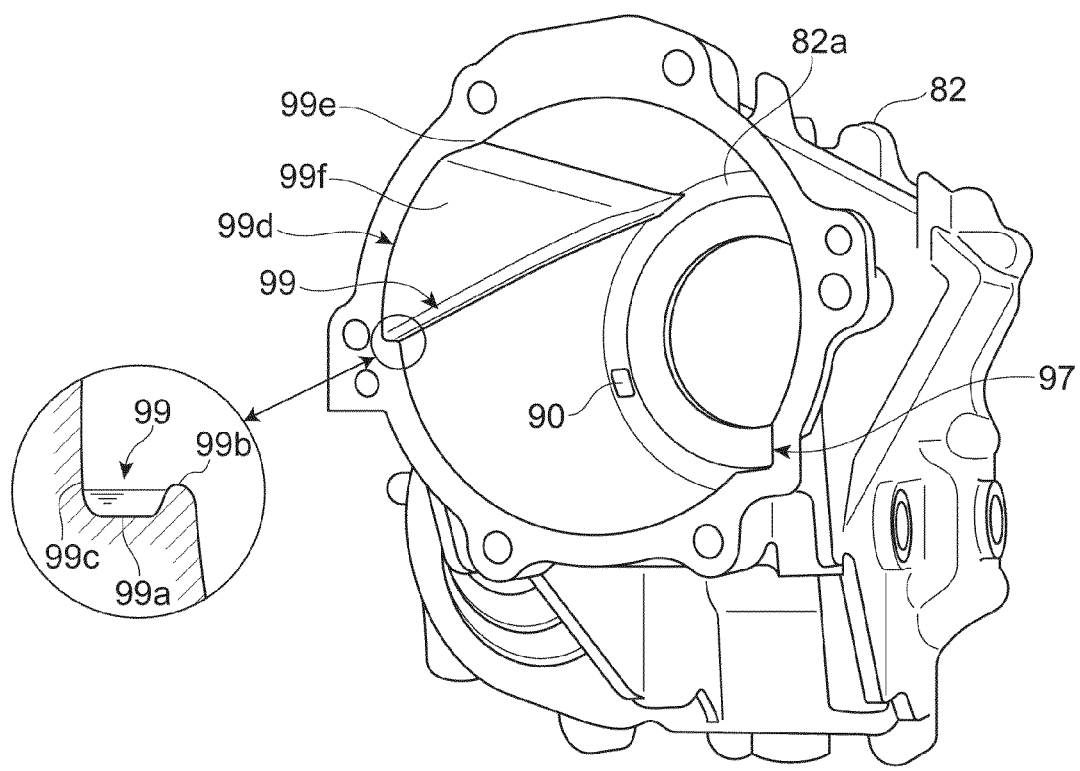
FIG. 6 is a perspective view of a coupling chamber lubrication path provided in the second case member.
Figure 7:
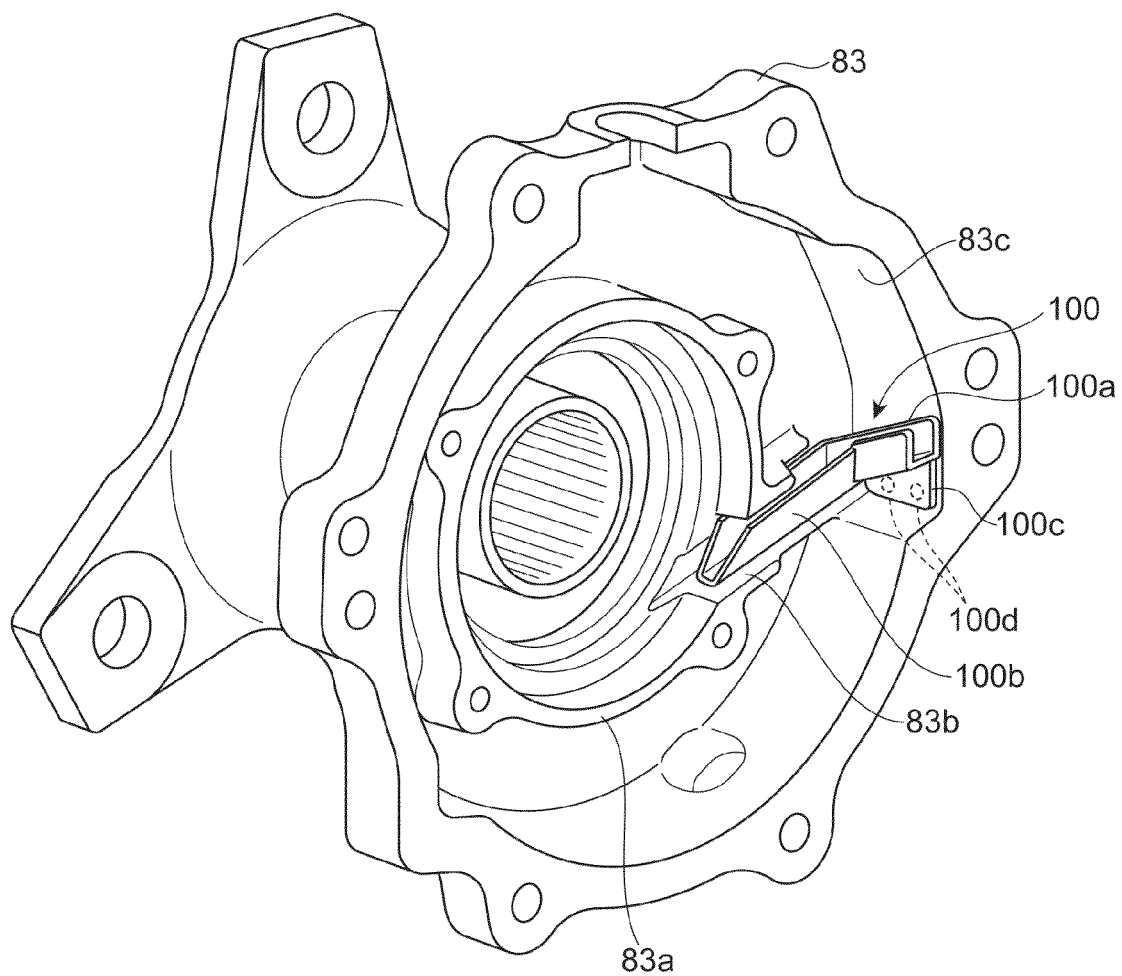
FIG. 7 is a perspective view of a guide member provided in a third case.

The coupling chamber lubrication path includes a lubrication groove 99 formed in the inner peripheral surface of the second case member 82 in FIG. 6, and a guide member 100 mounted inside the third case member 83 in FIG. 7.

As shown in FIG. 6, the lubrication groove 99 is formed in a half peripheral surface on a side opposite to the groove 97 of the return path in the inner peripheral surface of the coupling chamber Z2 so as to be inclined downward toward the vehicle rear side from the wall surface of the side wall 82a of the second case member 82 on the side of the coupling chamber to the end surface of the second case member 82 on the side opposite to the gear chamber, that is, the mating surface with the third case member 83. An upper end of the lubrication groove 99 is located slightly lower than a top of the coupling chamber Z2, and a lower end of the lubrication groove 99 is located substantially at the same height as the axis of the coupling chamber Z2.

The lubrication groove 99 includes a horizontal flow surface 99a, a projection 99b located radially inward of the flow surface 99a, and a side surface 99c located radially outward of the flow surface 99a, when seen in a cross section of the coupling chamber Z2.

The flow surface 99a is inclined to receive thereon the lubricant retained in the lower part of the coupling chamber Z2 and scooped by rotation of the rotary member such as the main clutch 21 and cause the lubricant to flow by gravity.

Figure 14A:
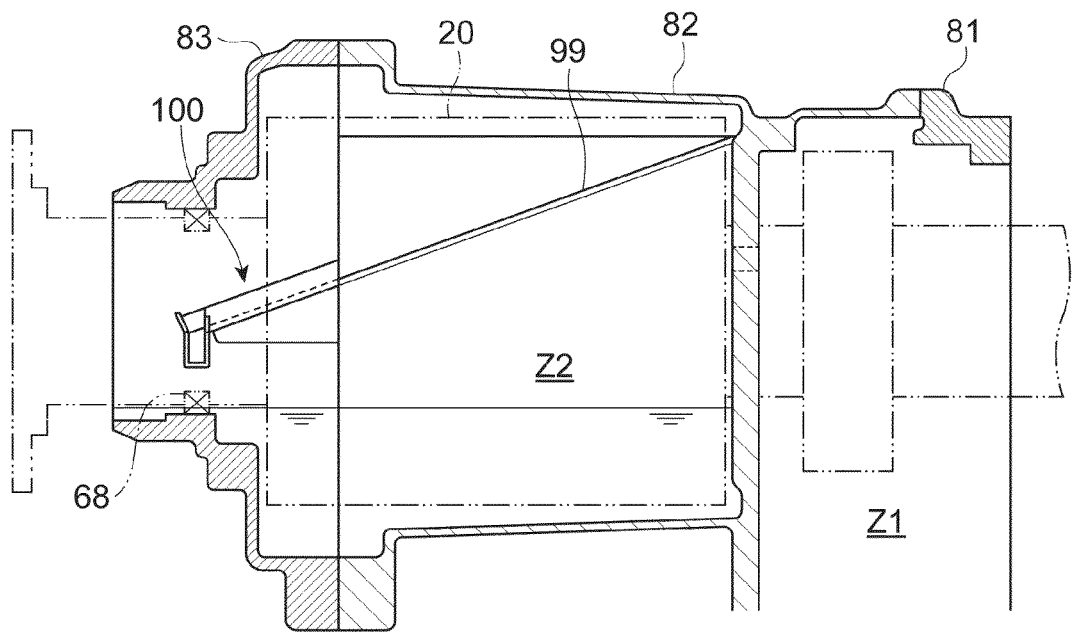
FIG. 14A is a sectional view of a lubricant retaining state in the transfer case according to the embodiment of the present disclosure in a vehicle horizontal state, taken in the direction of arrow D-D in FIG. 4.

The flow surface 99a is formed on the same inclined surface from an upper end to a lower end, and has an inclination angle of 20 degrees so that the lubricant flows toward the vehicle rear side even when the vehicle descends a slope of 30% (16.7 degrees) (see FIG. 14). An upper surface of the projection 99b is continuous with the inner peripheral surface of the coupling chamber Z2 with a curve, an upper surface of the projection 99b is continuous with a side surface on the side of the flow surface 99a with a curve, and a side surface of the projection 99b is continuous with the flow surface 99a with a curve. The flow surface 99a is continuous with the side surface 99c with a curve. The projection 99b prevents the lubricant flowing on the flow surface 99a from flowing into the coupling chamber Z2. In other words, the projection 99b defines a level of the lubricant flowing on the flow surface 99a.

A separation recess 99d continuous with the side surface 99c is formed on an upper side of the lubrication groove 99 to allow release of an inner die for forming the coupling chamber Z2 and the lubrication groove 99. The separation recess 99d includes an upper edge 99e extending on the inner peripheral surface of the coupling chamber Z2 from the upper end of the lubrication groove 99 to the end surface of the second case member 82 axially of the coupling chamber Z2, and a curved portion 99f recessed from the upper edge 99e radially outward of the inner peripheral surface of the coupling chamber Z2 and continuous with the side surface 99c of the lubrication groove 99, and has a triangular shape when seen from inside the coupling chamber Z.

As shown in FIG. 7, the guide member 100 mounted inside the third case member 83 includes an oil receiving portion 100a, an oil guide portion 100b, and a mounting portion 100c.

The oil receiving portion 100a has a tub shape with an upper end abutting against the lower end of the lubrication groove 99 in the coupling chamber Z2 of the second case member 82, inclined at the same gradient as the lubrication groove 99, and extending to a lower end axially of the third case member 83.

The oil guide portion 100b has a tub shape extending radially of the third case member 83 from the lower end of the oil receiving portion 100a through a groove 83b formed in part of the support 83a for the bearing 68 to near the bearing 68.

The mounting portion 100c has a plate shape protruding downward from a radially outer side wall of the oil receiving portion 100a. The mounting portion 100c has a mounting protrusion 100d press-fitted in a mounting recess 83c formed in the inner peripheral surface of the third case member 83.

The guide member 100 is mounted inside the third case member 83 by the mounting protrusion 100d of the mounting portion 100c being press-fitted in the mounting recess 83c in the third case member 83. Thus, the lubricant flowing from the vehicle front side through the lubrication groove 99 in the second case member 82 is guided by the guide member 100 to lubricate the bearing 68 and the bearing 69 near the bearing 68 in the third case member 83 located on the vehicle rear side.

Figure 8A:
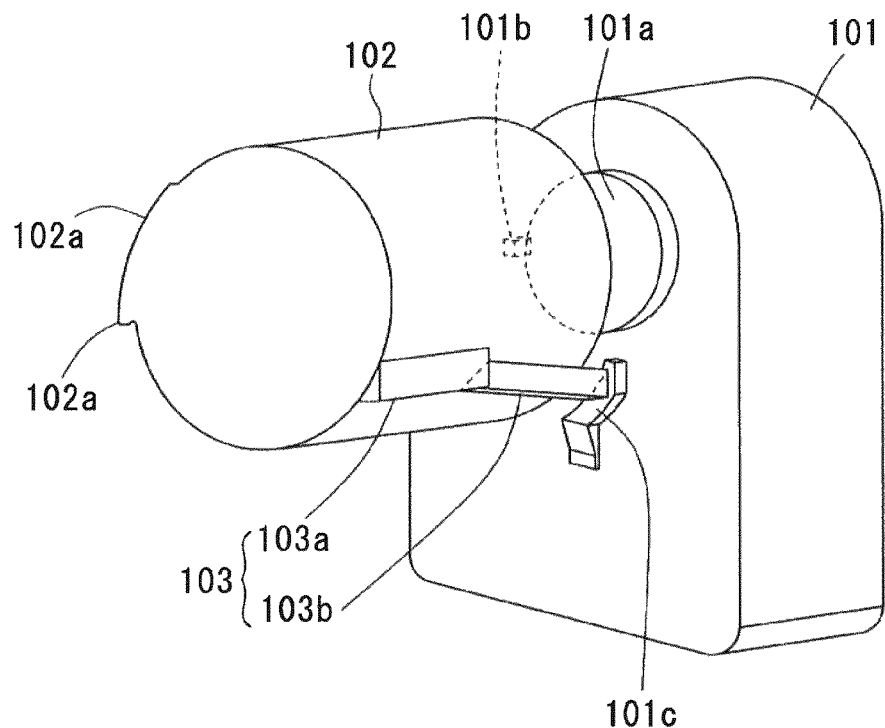
FIG. 8A is a perspective view of inner dies for forming a gear chamber and a coupling chamber of a second case.
Figure 8B:
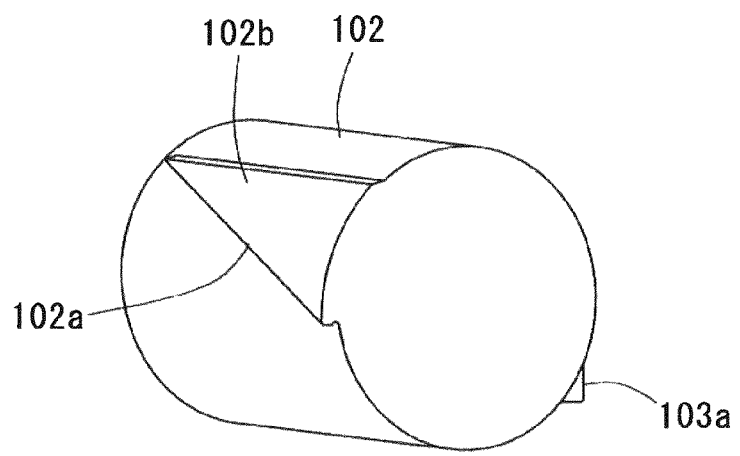
FIG. 8B is a perspective view of the inner die for forming the coupling chamber of the second case.
Figure 9:
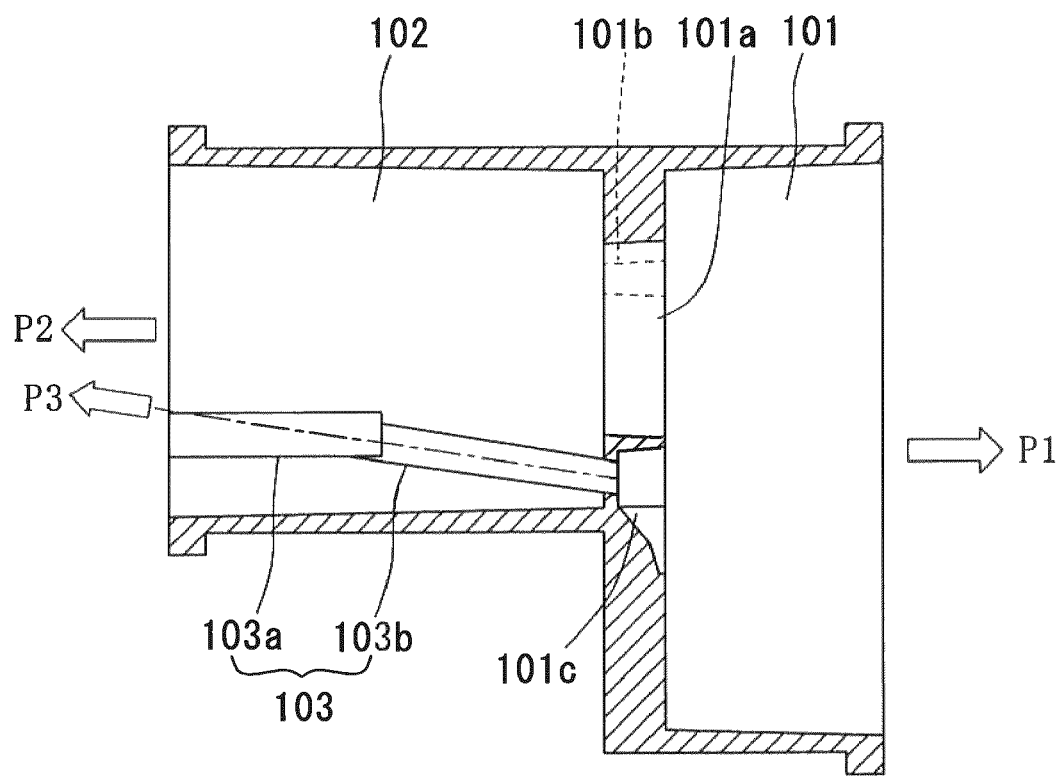
FIG. 9 is a sectional view of the inner dies for forming the gear chamber and the coupling chamber of the second case.

With reference to FIGS. 8 and 9, an example of a die for forming the introduction path and the return path will be described.

As shown in FIG. 8A, a first inner die 101 for forming the gear chamber Z1 of the second case member 82 includes a first projection 101a for forming a shaft hole for the output shaft for rear wheels 11 and the power transmission member 36 in the side wall 82a of the second case member 82, a second projection 101b for forming the oil feed hole 90, and a third projection 101c for forming the discharge port 91.

A cutting die 103 for forming the groove 97 and the through portion 96 is attached to the second inner die 102 for forming the coupling chamber Z2 of the second case member 82. The cutting die 103 includes a bar-shaped first die 103a having a triangular section for forming the groove 97, and a bar-shaped second die 103b having a triangular section and extending obliquely downward from an end of the first die 103a for forming the through portion 96. An end of the second die 103b abuts against the third projection 101c of the first inner die 101.

Further, as shown in FIG. 8B, on an outer peripheral surface of the second inner die 102 for forming the coupling chamber Z2 of the second case member 82, a first projection 102a for forming the lubrication groove 99 and a second projection 102b for forming the separation recess 99d are continuously integrally formed.

The first inner die 101, the first projection 101a, the second projection 101b, and the third projection 101c have drafts so as to allow release in the direction of arrow P1 parallel to the axial direction, and the second inner die 102 and the first projection 102b also have drafts so as to allow release in the direction of arrow P2 parallel to the axial direction. In particular, a surface of the first projection 102a of the second inner die 102 for forming the side surface of the projection 99b of the lubrication groove 99 on the side of the flow surface 99a has a draft so as to allow release in the direction of arrow P1 parallel to the axial direction P2. The first die 103a of the cutting die 103 attached to the second inner die 102 has a draft so as to allow release in the direction of arrow P3 parallel to the axial direction of the through portion 96.

As shown in FIG. 9, the first inner die 101 and the second inner die 102 are released in the directions of arrows P1 and P2, and then the cutting die 103 is drawn in the direction P3 along an axis of the second die 103b for forming the through portion 96 and thus can be released. Thus, simultaneously with the gear chamber Z1 being formed, the oil feed hole 90 and the discharge port 91 are formed. Also, simultaneously with the coupling chamber Z2 being formed, the groove 97, the opening 94, the oil discharge hole 95, and the through portion 96 are formed and the lubrication groove 99 is formed.

Operation of Lubricant Guide Structure

Next, an operation of the lubricant guide structure for cooling the coupling 20 in this embodiment will be described.

First, as shown in FIG. 3, in the transfer device 10, the driven gear 14 mating with the drive gear 13 rotates during driving, and the driven gear 14 scoops the lubricant retained in the gear chamber Z1 to lubricate the drive gear 13.

In this embodiment, as described above, the side 14c on the front side of the tooth surface 14b in the rotational direction R1 of the driven gear 14 as the helical gear is located on the vehicle front side (see FIG. 3).

Thus, as shown in FIG. 3, the lubricant on the tooth surface 14b of the driven gear 14 is about to flow in the direction of arrow R2 along the inclination of the tooth surface 14b of the driven gear 14 in a static state. However, since the driven gear 14 is rotating in the direction of arrow R1, the lubricant is likely to be dispersed toward the vehicle rear side.

The oil path 93 is provided on the vehicle rear side of the driven gear 14. Thus, the lubricant dispersed from the driven gear 14 toward the vehicle rear side is received, flows circumferentially along the base surface 93a of the oil path 93 along with the rotation of the driven gear, and flows through the notch 93d into the oil feed hole 90. This allows the lubricant in the gear chamber Z1 to be effectively fed to the coupling chamber Z2.

As shown by arrow R4 in FIG. 4B, the lubricant scooped and dispersed by the driven gear 14 is guided to the guide portion 90a of the oil feed hole 90. The oil feed hole 90 is provided along the outer periphery of the support 82b, and thus the lubricant dispersed from the driven gear 14 toward the drive gear 13 is guided to the oil feed hole 90 as shown by arrow R5 with part of the outer peripheral surface 82c of the support 82b functioning as the guide portion 90e.

Figure 10:
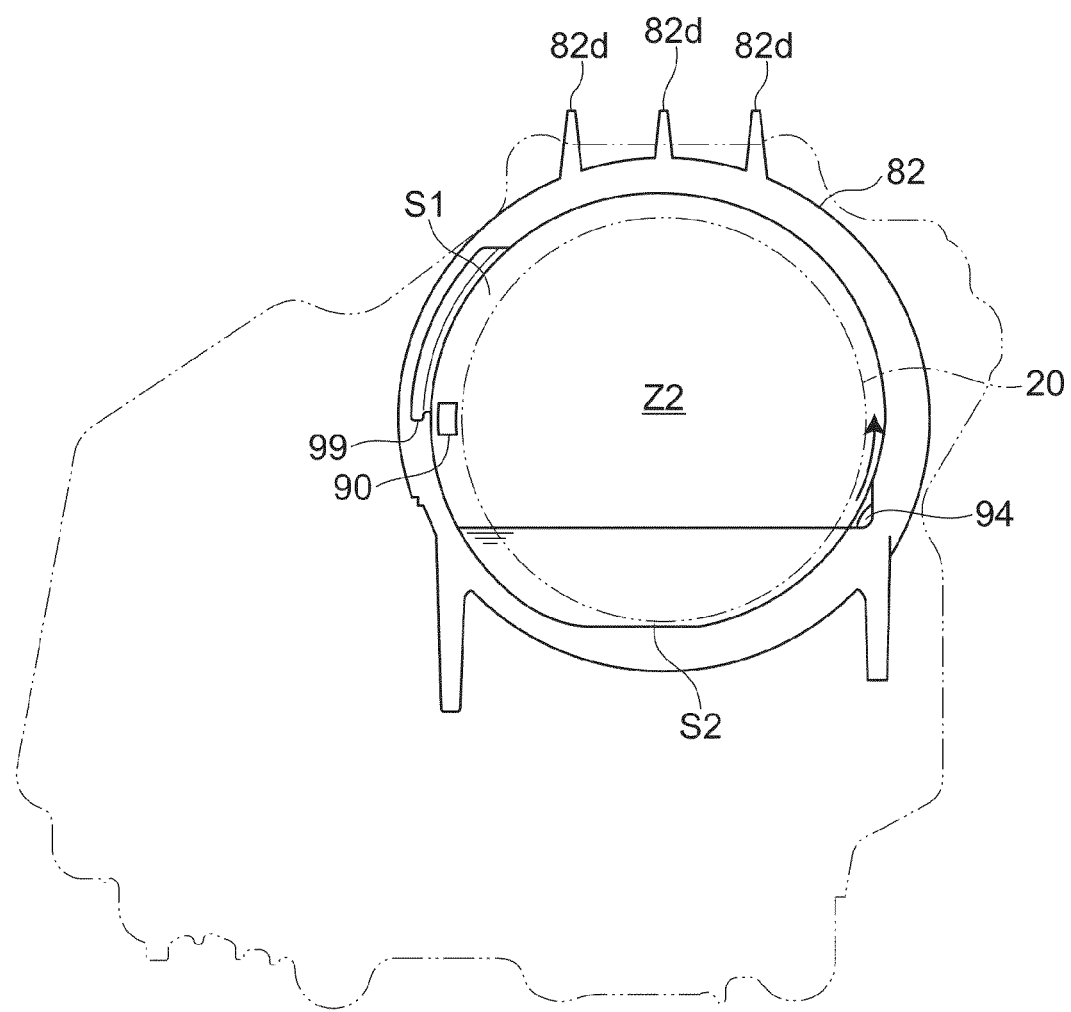
FIG. 10 is an end view of the transfer case taken in the direction of arrow B-B in FIG. 2.
Figure 11:
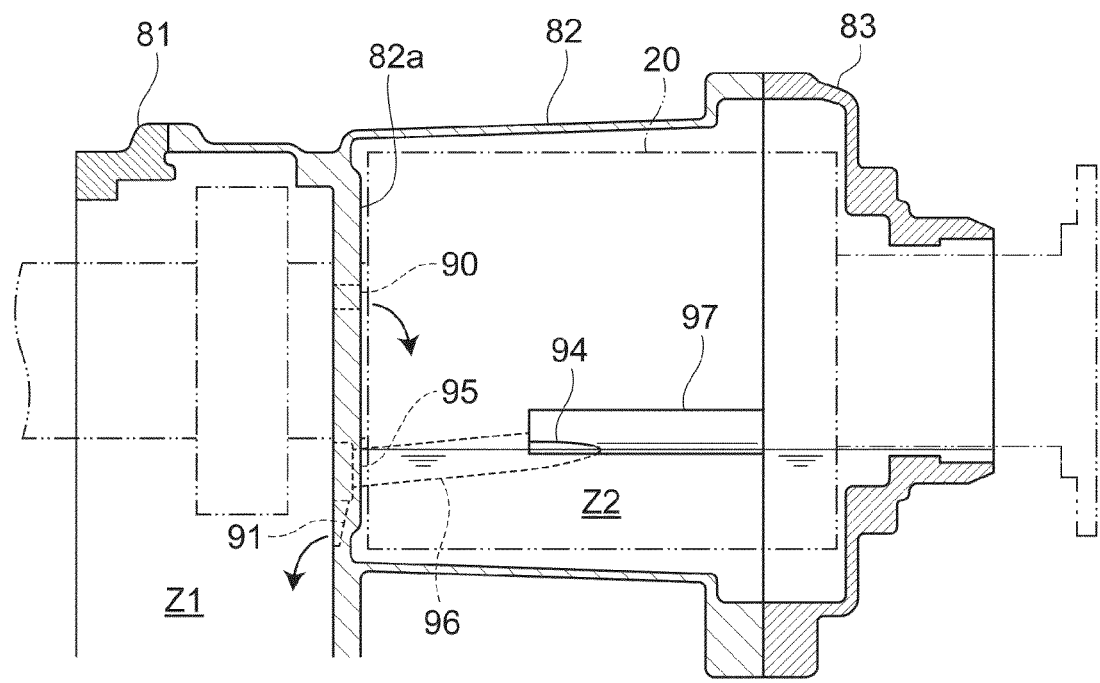
FIG. 11 is a sectional view of a lubricant retaining state in the transfer case taken in the direction of arrow C-C in FIG. 4.

As shown in FIGS. 10 and 11, the lubricant introduced from the gear chamber Z1 through the oil feed hole 90 that constitutes the introduction path into the coupling chamber Z2 is retained at the bottoms of the second case member 82 and the third case member 83. If the lubricant level exceeds the opening 94 of the return path formed in the lower part of the intermediate part of the coupling chamber Z2 in the front-rear axial direction, the lubricant is returned from the opening 94 through the through portion 96 and the oil discharge hole 95 and through the discharge port 91 to the gear chamber Z1. The lubricant retained in the coupling chamber Z2 is agitated by the rotating coupling 20 and cools the coupling 20.

The opening 94 of the return path is located at the lower position than the oil feed hole 90, and thus the lubricant retained in the coupling chamber Z2 is held at an appropriate level.

This can reduce agitation resistance due to the rotation of the coupling 20, and thus effectively cool the coupling 20.

The lubricant used for cooling the coupling 20 in the coupling chamber Z2 is returned to the gear chamber Z1, and thus the lubricant cooled in the lower part of the gear chamber Z1 can be again fed to the coupling chamber Z2.

Thus, the cooled lubricant can cool the coupling 20, thereby allowing more efficient cooling of the coupling 20. This can achieve efficient lubrication of the drive gear 13 and the driven gear 14 and cooling of the coupling 20 without increasing an amount of the lubricant more than necessary.

As shown in FIG. 10, the second case member 82 that forms the coupling chamber Z2 includes a plurality of fins 82d . . . 82d constituted by projections protruding from an upper part of the second case member 82. This allows heat exchange of the lubricant fed to the coupling chamber Z2 via the plurality of fins 82d . . . 82d of the second case member 82.

A gap S1 is provided between the coupling chamber Z2 and the coupling 20. In the lower part of the coupling chamber Z2, a gap S2 between the coupling chamber Z2 and the coupling 20 is narrower than the gap S1 in other parts.

The lubricant retained in the lower part of the coupling chamber Z2 is agitated by rotation of the coupling 20 and raised upward of the coupling chamber Z2. At this time, the gap between the lower part of the coupling chamber Z2 and the coupling 20 is narrow, thereby increasing a flow speed of the lubricant and allowing the lubricant to be raised further upward of the coupling chamber Z2.

The upper part of the coupling chamber Z2 is cooled by the plurality of fins 82d . . . 82d, thus the lubricant raised upward is cooled, and the cooled lubricant can more efficiently cool the coupling 20.

Figure 12:
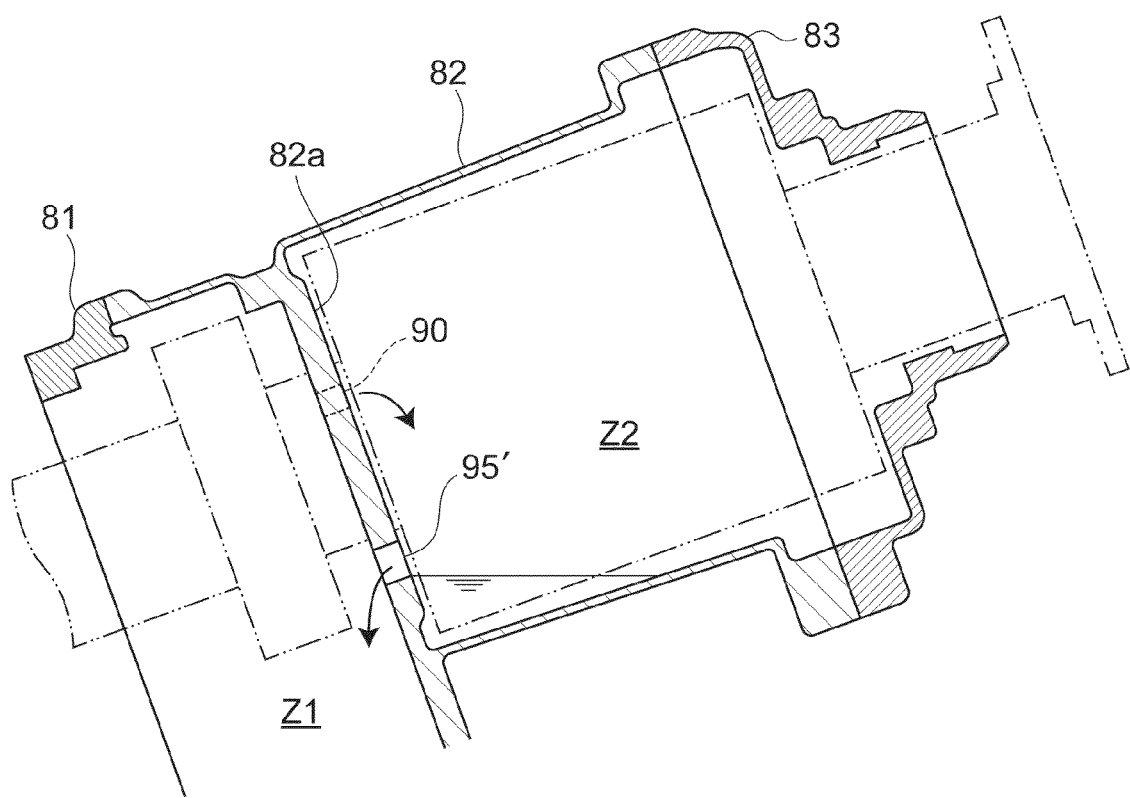
FIG. 12 is a sectional view of a lubricant retaining state in a conventional transfer case when a vehicle is inclined downward toward a front side.

When the vehicle travels on a downward slope or the like in a downward inclined state toward the front side, the transfer device 10 is also inclined downward toward the vehicle front side. As in a conventional example in FIG. 12, if an oil discharge hole 95' opens in a side wall 82a, a large amount of lubricant is discharged from the oil discharge hole 95' to a gear chamber Z1 to reduce the lubricant in the coupling chamber Z2 and reduce a cooling effect of a coupling 20.

Figure 13A:
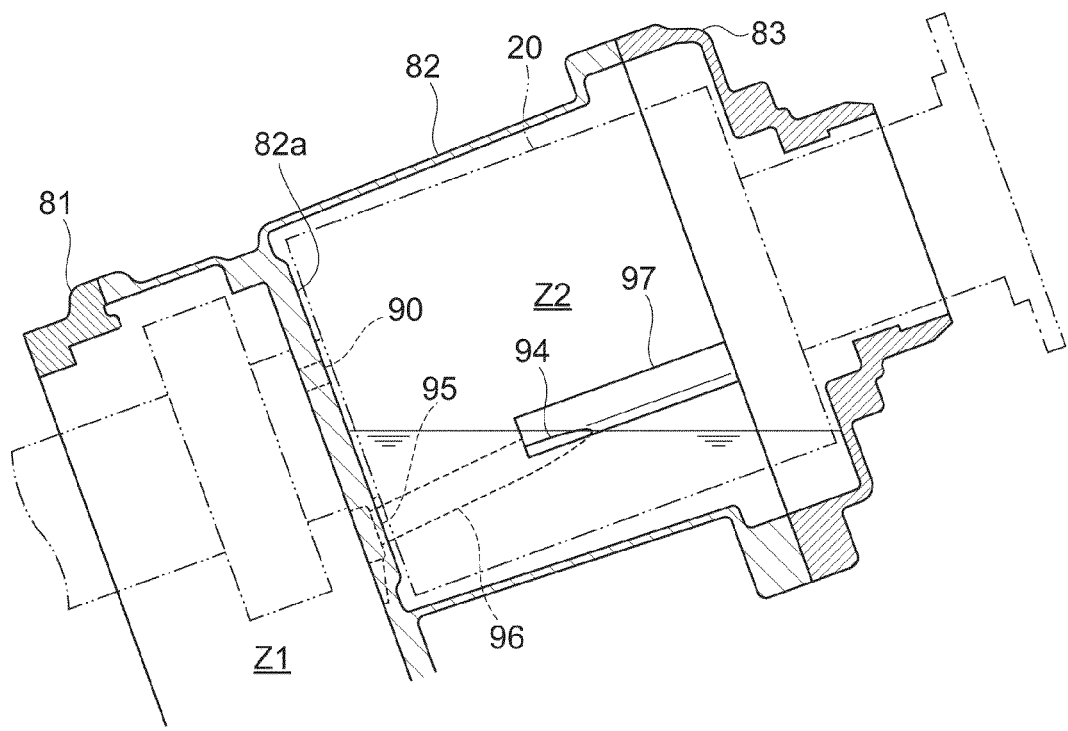
FIG. 13A is a sectional view of a lubricant retaining state in the transfer case according to the embodiment of the present disclosure when the vehicle is inclined downward toward a front side.

In the present disclosure, as shown in FIG. 13A, the opening 94 of the return path opens in the intermediate part of the coupling chamber Z2 and is located at the position higher than the oil discharge hole 95. Thus, even if the vehicle is inclined downward toward the front side, the lubricant in the coupling chamber Z2 is not discharged from the oil discharge hole 95 but maintained at the position of the opening 94 higher than the oil discharge hole 95.

Figure 13B:
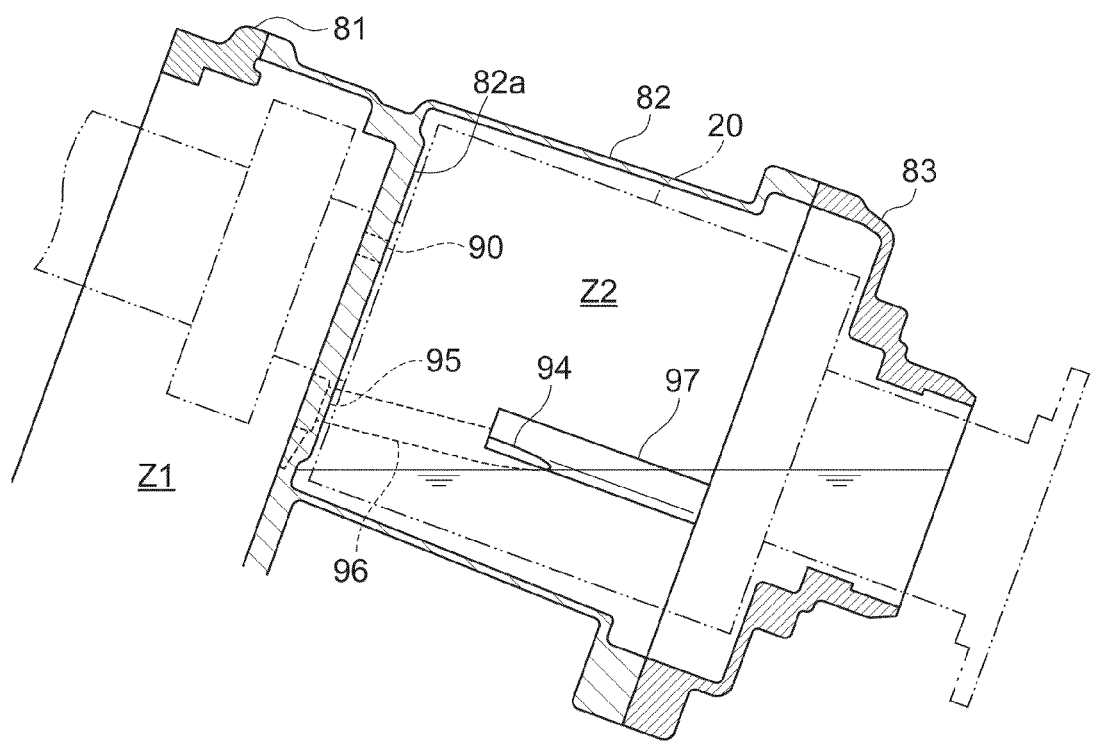
FIG. 13B is a sectional view of a lubricant retaining state in the transfer case according to the embodiment of the present disclosure when the vehicle is inclined upward toward the front side.

As such, the amount of lubricant in the coupling chamber Z2 is ensured, and thus as shown in FIG. 13B, the coupling 20 can be sufficiently cooled even when the vehicle travels on an upward slope or the like in a downward inclined state toward the rear side.

Even if the amount of lubricant in the coupling chamber Z2 is ensured, the bearings 68, 69 (see FIG. 2) on the rear side of the coupling chamber Z2 are located above the lubricant level when the vehicle travels in a downward inclined state toward the front side, and an insufficient amount of lubricant is fed to the bearings 68, 69. In the present disclosure, the lubrication groove 99 and the guide member 100 of the coupling chamber lubrication path in FIG. 14A feed the lubricant to the bearings 68, 69 on the rear side of the coupling chamber Z2.

Figure 14B:
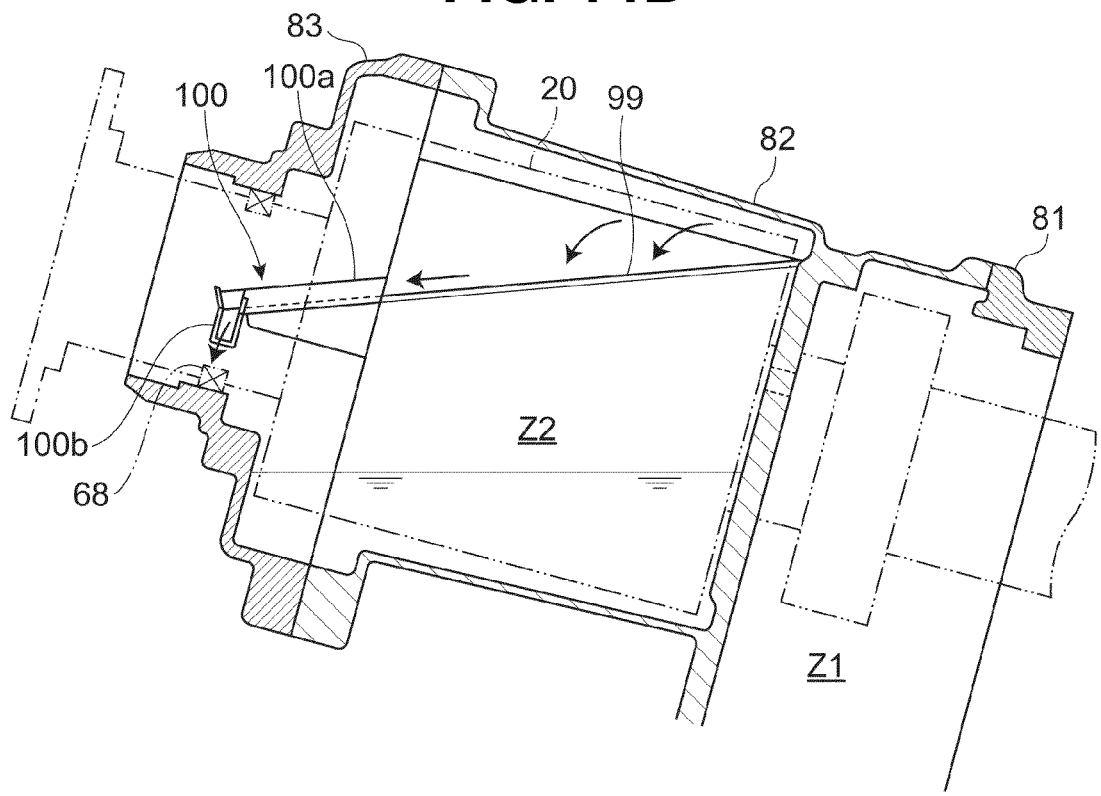
FIG. 14B is a sectional view of a lubricant retaining state in the transfer case according to the embodiment of the present disclosure when the vehicle is inclined upward toward the front side.

Specifically, as shown in FIG. 14B, the lubricant scooped by the coupling 20 is dispersed to the inner peripheral surface of the coupling chamber Z2, and part of the lubricant is received in the lubrication groove 99 provided in the inner peripheral surface of the coupling chamber Z2, and flows rearward of the vehicle by its own weight along the inclination of the flow surface 99a. The projection 99b (see FIG. 6) prevents the lubricant flowing through the lubrication groove 99 from falling into the coupling chamber Z2.

The lubricant having reached the lower end of the lubrication groove 99 is received in the oil receiving portion 100a of the guide member 100 mounted in the third case member 83, flows downward through the oil receiving portion 100a, turns its direction at a downstream end of the oil receiving portion 100a and flows through the oil guide portion 100b radially of the third case member 83, and is fed to the bearings 68, 69. Thus, as shown in FIG. 14B, even when the vehicle travels in a downward inclined state toward the front side, insufficient lubrication of the bearings 68, 69 on the rear side of the coupling chamber can be prevented.

The present disclosure is not limited to the illustrated embodiment, but various improvements and design changes may be made without departing from the gist of the present disclosure.

For example, in the embodiment, the return path for the lubricant is formed by the through portion 96 extending through the inner peripheral wall of the coupling chamber Z1 from the opening 94 that opens in the coupling chamber Z1 to the oil discharge hole 95 that opens in the gear chamber Z1, but the opening 94 and the oil discharge hole 95 may be coupled by a pipe provided outside the coupling chamber Z1.

In the embodiment, the transfer device is applied to the front engine and rear drive based four-wheel-drive vehicle, but the present disclosure may be applied to a rear engine and front drive based four-wheel-drive vehicle.

What is claimed is:

1. A transfer structure for a vehicle, comprising:
   a gear chamber housing a first gear and a second gear meshing with each other;
   a coupling chamber housing a coupling provided coaxially with the first gear;
   an introduction path through which a lubricant in the gear chamber is introduced into the coupling chamber;
   a return path through which the lubricant introduced into the coupling chamber is returned to the gear chamber, the return path being inclined downward toward the gear chamber from an opening that opens in a lower part of an intermediate part of the coupling chamber in a vehicle front-rear direction to an oil discharge hole that opens in the gear chamber, and
   a cover member which closes the coupling chamber on a side opposite to the gear chamber, and
   wherein
   the coupling chamber has an inner peripheral surface including a groove that is parallel to the axis of the coupling chamber and extends from a mating surface between the coupling chamber and the cover member to the intermediate part of the coupling chamber in the vehicle front-rear direction, and
   the opening is in an end surface of the groove in the intermediate part in the vehicle front-rear direction.

2. The transfer structure for a vehicle according to claim 1, wherein the return path has a through portion extending through an inner peripheral wall of the coupling chamber obliquely to an axis of the coupling chamber.

3. A transfer structure for a vehicle, comprising:
   a gear chamber housing a first gear and a second gear meshing with each other;
   a coupling chamber housing a coupling provided coaxially with the first gear;
   an introduction path through which a lubricant in the gear chamber is introduced into the coupling chamber; and
   a return path through which the lubricant introduced into the coupling chamber is returned to the gear chamber, the return path being inclined downward toward the gear chamber from an opening that opens in a lower part of an intermediate part of the coupling chamber in a vehicle front-rear direction to an oil discharge hole that opens in the gear chamber, wherein
   the coupling chamber has a side wall that separates the coupling chamber from the gear chamber, and
   the oil discharge hole of the return path is in the side wall.

4. The transfer structure for a vehicle according to claim 3, wherein
   an oil feed hole of the introduction path is formed in the side wall, and
   the oil feed hole is formed in a position corresponding to a rear side of a meshing portion between the first gear and the second gear in a rotational direction.

5. The transfer structure for a vehicle according to claim 1, further comprising
   an oil temperature sensor disposed in the return path and configured to detect a temperature of the lubricant.

6. A transfer structure for a vehicle, comprising:
   a gear chamber housing a first gear and a second gear meshing with each other;
   a coupling chamber housing a coupling provided coaxially with the first gear;
   an introduction path through which a lubricant in the gear chamber is introduced into the coupling chamber;
   a return path through which the lubricant introduced into the coupling chamber is returned to the gear chamber, the return path being inclined downward toward the gear chamber from an opening that opens in a lower part of an intermediate part of the coupling chamber in a vehicle front-rear direction to an oil discharge hole that opens in the gear chamber; and a cover member which closes the coupling chamber on a side opposite to the gear chamber, wherein the return path has a through portion extending through an inner peripheral wall of the coupling chamber obliquely to an axis of the coupling chamber;

the coupling chamber has an inner peripheral surface including a groove that is parallel to the axis of the coupling chamber and extends from a mating surface between the coupling chamber and the cover member to the intermediate part of the coupling chamber in the vehicle front-rear direction, and the opening is in an end surface of the groove in the intermediate part in the vehicle front-rear direction.

7. The transfer structure for a vehicle according to claim 2, wherein the coupling chamber has a side wall that separates the coupling chamber from the gear chamber, and the oil discharge hole of the return path is in the side wall.

8. The transfer structure for a vehicle according to claim 1, wherein the coupling chamber has a side wall that separates the coupling chamber from the gear chamber, and the oil discharge hole of the return path is in the side wall.

9. The transfer structure for a vehicle according to claim 7, wherein an oil feed hole of the introduction path is formed in the side wall, and the oil feed hole is formed in a position corresponding to a rear side of a meshing portion between the first gear and the second gear in a rotational direction.

10. The transfer structure for a vehicle according to claim 8, wherein an oil feed hole of the introduction path is formed in the side wall, and the oil feed hole is formed in a position corresponding to a rear side of a meshing portion between the first gear and the second gear in a rotational direction.

11. The transfer structure for a vehicle according to claim 6, wherein an oil feed hole of the introduction path is formed in the side wall, and the oil feed hole is formed in a position corresponding to a rear side of a meshing portion between the first gear and the second gear in a rotational direction.

12. The transfer structure for a vehicle according to claim 2, further comprising an oil temperature sensor disposed in the return path and configured to detect a temperature of the lubricant.

13. The transfer structure for a vehicle according to claim 3, further comprising an oil temperature sensor disposed in the return path and configured to detect a temperature of the lubricant.

14. The transfer structure for a vehicle according to claim 7, further comprising an oil temperature sensor disposed in the return path and configured to detect a temperature of the lubricant.

15. The transfer structure for a vehicle according to claim 8, further comprising an oil temperature sensor disposed in the return path and configured to detect a temperature of the lubricant.

16. The transfer structure for a vehicle according to claim 6, further comprising an oil temperature sensor disposed in the return path and configured to detect a temperature of the lubricant.

* * * * *